W. Earl, Jr.

Spinning Mule.

No. 2,351. Reissued Sept. 4, 1866.

N. PETERS, PHOTO-LITHOGRAPHER, WASHINGTON, D. C.

UNITED STATES PATENT OFFICE.

WILLIAM EARL, JR., OF NASHUA, NEW HAMPSHIRE, ASSIGNEE OF THOMAS PYE.

IMPROVEMENT IN SPINNING-MACHINES.

Specification forming part of Letters Patent No. 46,386, dated February 14, 1865; Reissue No. 2,351, dated September 4, 1866.

*To all whom it may concern:*

Be it known that THOMAS PYE, of the town of New Hartford, in the county of Oneida and State of New York, did, on the 14th day of February, A. D. 1865, obtain of and from the United States of America certain Letters Patent for and upon certain new and useful improvements in spinning machinery of woolen-manufactories, and bearing the title of "Improvements in Spinning-Machines," which Letters Patent have been duly assigned to WILLIAM EARL, Jr., by which assignment the said WILLIAM EARL, Jr., has become, and is, the true and lawful owner and holder of the entire interest in said invention, improvements, and patents; and I, the said WILLIAM EARL, Jr., assignee of said patent, do hereby declare that the following is a full, clear, and exact description of the said invention and improvements, reference being had to the accompanying drawings, and to the letters of reference marked thereon, which said drawings make a part of this specification.

Like letters represent and refer to like or corresponding parts.

Figure 1:
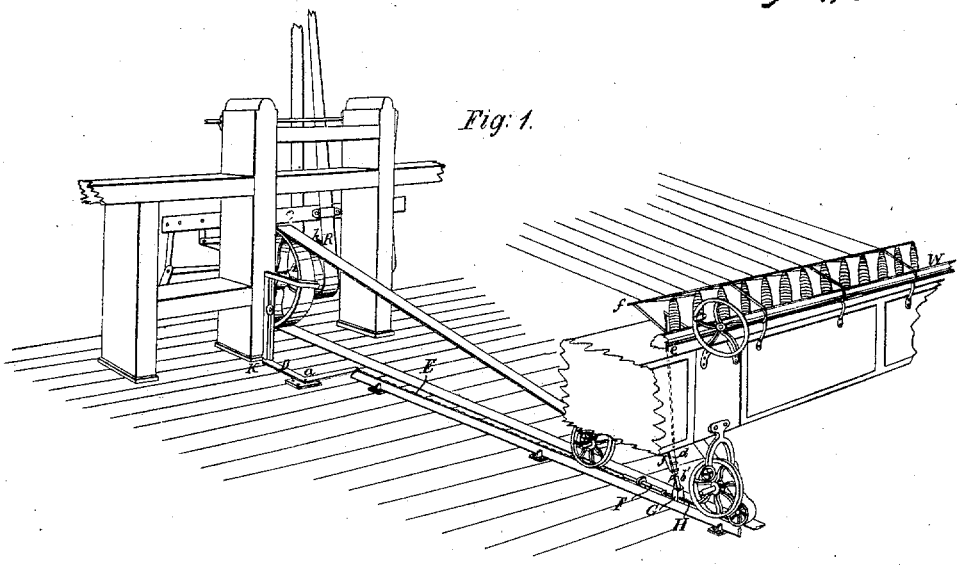
Figure 2:
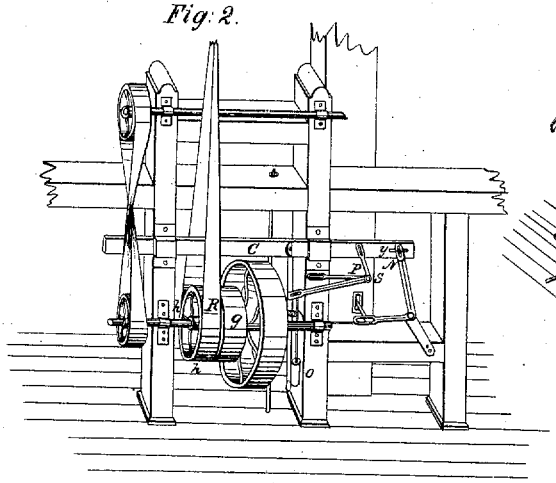
Figure 5:
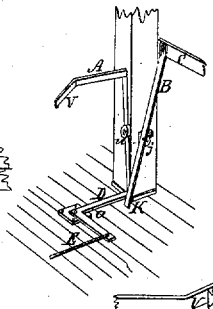
Figure 4:
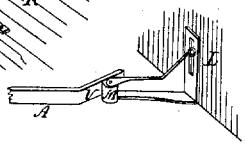
Figure 3:
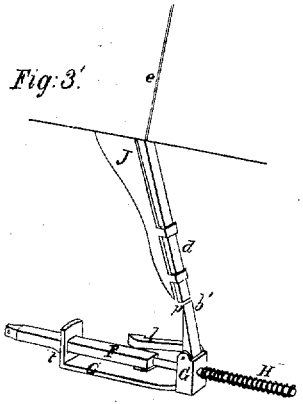
Figure 3:
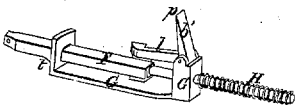

Figure 1 is a perspective view of a spinning-jack and the stationary machinery with which it is usually connected, with the said invention and improvements attached. The jack is represented at that point in its operation where it is drawn out farthest from the stationary machinery, and when the twist of the thread is completed and the jack is ready to be run up for the purpose of winding the thread upon the bobbins. Fig. 2 is a rear view of the said stationary machinery shown in Fig. 1, and shows the manner of the operation of the said invention in changing the belt from the tight to the loose pulley, as hereinafter described. Fig. 3 is a view of the slide-bolt, with the spiral spring by which it is actuated, and moving in the bolt-stock; also, the shoe or latch operated by the drop-lever attached to the bottom of the jack and connected with the follower and guide-wire, as hereinafter described and set forth. Fig. 4 represents a metal frame attached to the carriage of the jack, at the end of which frame is a friction-roller in the act of operating the crooked lever connected with the belt-shifter by means of the angular lever, as hereinafter set forth. Fig. 5 represents the said angular lever connected at one end by a chain with the slide bolt and spring above mentioned; also the crooked lever, which is operated by said friction-roller, and the oblique lever connected with and moving the belt-shifter, as hereinafter described.

The nature of the said invention consists in moving the belt-shifter of a spinning-machine by the ordinary operation of the machine, at the moment when the jack is drawn out to the utmost extent and when the thread is completely twisted and the jack is about to be returned, in such a manner that the driving-belt is thrown partially on the tight pulley, thereby materially assisting the operator in running up the jack and making a tight bobbin.

It also consists in moving the said belt-shifter by the ordinary operation of the machine at the moment when the jack is nearly run up and at the proper point for piecing up the threads, and just before the thread is completely wound up, in such a manner that the driving-belt is thrown entirely off the tight pulley and upon the loose pulley, thereby preventing the abrasion of the belt upon the tight pulley while the jack is stationary.

It also consists in the employment of the various mechanical devices herein described, arranged, combined, and operated substantially in the manner and for the purposes hereinafter described and set forth.

Having thus described the nature of the said invention and improvements, and to enable others skilled in the art to which the same relates to make and use the said invention, I will here proceed to describe the construction and operation thereof, which is as follows, to wit:

A, Figs. 1, 4, and 5, is a crooked lever with an oblique surface, V, moving on its center *u*, and attached at its lower end to the angular lever D, Figs. 1 and 5.

B, Fig. 5, is an oblique lever moving on its center *j*, with its lower end resting against the end of the angular lever D, and connected at its upper end with the belt-shifter C, Figs. 1, 2, and 5.

D, Figs. 1 and 5, is an angular lever moving on its center *a*, and connected by the chain E with the sliding bolt F, Figs. 1, 3, and 3′, moving in the bolt-stock G, Figs. 3 and 3′, and surrounded at that part beyond the bolt-stock by the spiral spring H.

*b*, Figs. 3 and 3′, is a shoe with a catch, *t*, which holds the slide-bolt F when operated, as hereinafter described.

J, Figs. 1 and 3′, is a piece of iron or other material fastened to the bottom of the carriage of the jack, and to which the drop or sliding bar *d* is attached, and which lever is connected with the faller W by a cord or wire, which will answer the purpose required.

L, Fig. 4, is a metal frame attached to the inner side of the carriage, and M is a friction-roller moving freely in said frame.

O, Fig. 2, is a weight which operates the angular lever P, moving on the pivot S, and connected with the belt-shifter C, for the purpose hereinafter described.

R, Figs. 1 and 2, is the belt which drives the machinery, and *g* is the tight, and *h* the loose, pulley.

In order to understand the operation of the said invention, suppose the position of the machine to be as shown in Fig. 1, when the jack has been drawn out as far as possible, the threads have been twisted, and the jack commences to return for the purpose of winding up the twisted yarn. The belt R is mainly on the loose pulley *h*, but sufficiently on the tight pulley to assist in running up the jack. The belt is retained on the tight pulley *g* by means of the angular lever D, which presses against the foot of the oblique lever B, and holds the same, and through it the belt-shifter C, firmly in position. As the jack, on being run up, approaches the stationary machinery the friction-roller M, moving in the arm or frame L, attached and combined, as aforesaid, to the carriage of the jack, strikes the oblique arm V of the crooked lever A. This conjunction is seen at M V, Fig. 4. As the said roller M strikes the said oblique arm it throws the upper end of the said lever A to the right and, of course, the lower end to the left, carrying with it the end of the angular lever D, to which it is attached and combined, and allowing the lower end of the oblique lever B, which has hitherto rested against said angular lever D, to move freely to the left. This obstruction being removed, the weight O acts upon the angular lever P, Fig. 2, and moves the belt-shifter C, throwing the belt R wholly off the tight pulley and keeping it off by means of the catch *t*, Figs. 3 and 3′, holding the slide-bolt F, as hereinafter described.

As one end of the angular lever D is drawn to the left by the motion of the lever A, as above described, the other end, by means of the chain E, acts upon the slide-bolt F, thereby compressing the spiral spring H, and brings the shoulder of said slide-bolt beyond the catch *t*, which falls and prevents the said slide-bolt from receding, thereby permitting the weight O to hold the said belt-shifter and the lever B in the position above described while the operator is adjusting the thread upon the bobbins, and thus preventing the abrasion of the belt upon the tight pulley while the jack is stationary, and when the thread is completely wound up the belt is changed to the tight pulley by the usual operation, and then the jack is again run out.

The threads are twisted in the ordinary manner, and the usual movement takes place to return the belt to the loose pulley before starting the return movement of the jack. At this juncture the ordinary manipulation of the operator in dropping the guide-wire *f*, Fig. 1, for the purpose of adjusting the thread before winding it up, lowers the wire or cord *e*, Figs. 1 and 3′, which is connected with the faller W, Fig. 1, and allows the drop or sliding bar *d*, Figs. 1 and 3′, to strike the point or tip *b′* of the shoe *b* at *p*, Figs. 1, 3, and 3′, and thereby lifting the catch *t*, when the action of the spiral spring H brings back the slide-bolt F and the angular lever D to the position first above described. The action of the said angular lever D in this movement on the lever B at their point of contact at K operates the belt-shifter C, returning the bolt R partially on the tight pulley *g*, to assist the spinner, as before stated, in running up the jack and making a tight bobbin.

The distance on the tight pulley to which the belt is to be moved is regulated by the slot N, Fig. 2, in the belt-shifter C. Through this slot protrudes a bolt which acts against a stationary pin in the rear. This bolt is movable, and is regulated by the thumb-screw *y* with reference to the pin, so as to allow the belt to be moved upon the tight pulley just as far as the operator may desire. As the jack is again run up the friction-roller M again strikes the oblique arm V of the crooked lever A, and the same movement, as aforesaid, takes place to draw up the slide-bolt F, and to hold it by the catch *t*, as before, until the jack is again drawn out and disengages it, as above described.

Thus by the use of the said improvements the belt is on the tight pulley to assist in running up the jack and making a tight bobbin, and is kept from the tight pulley altogether while previously adjusting the thread on the bobbins, and this advantage is gained without any change in the manipulations of the spinner.

Having thus described the original invention of the aforesaid THOMAS PYE upon improvement in spinning-machines, what I claim as his invention and improvements, and desire to secure by Letters Patent, is—

1. The moving of the belt-shifter C in a spinning-machine by the ordinary operation of the machine at the point or time when the thread is fully twisted as desired and the jack is about to be returned for the purpose of winding up the thread in such manner that the belt R is partially thrown onto the tight pulley *g*, for the purpose of assisting the spinner in running up the jack and in making a tight bobbin, in the manner and by the means substantially as herein described and set forth.

2. The moving of the said belt-shifter C by the ordinary operation of the machine at the moment when the jack is nearly run up to the required or desired point or place for the piecing-up of the thread, and just before it is fully wound upon the bobbins, in such manner that the said belt is thrown wholly off from the tight pulley aforesaid, and upon the said loose pulley, in the manner and by the means substantially as herein described and set forth.

3. The employment of the crooked lever A, the oblique lever B, and the angular lever D, as arranged and combined, and then the whole in combination with the aforesaid belt-shifter C, in the manner and for the purposes substantially as herein described and set forth.

4. The employment of the chain E, arranged and combined with the angular lever D and the slide-bolt F, in the manner and for the purposes substantially as herein described and set forth.

5. The combination of the slide-bolt F with the coil or spiral spring H, the bolt-stock G, and the shoe *b*, and with the drop or sliding bar *d*, each being arranged and combined in the manner and for the purposes substantially as herein specified, described, and set forth.

6. The drop or sliding bar *d*, and the wire or cord *e*, connected and combined with the faller W, and with the shoe *b b'*, in the manner substantially as and for the purposes herein described and set forth.

7. The employment of the lever A, having an oblique arm, *v*, in combination with the lever *u*, and with the carriage of the jack aforesaid, by means of the arm or frame L, containing the friction-roller M, each being arranged and operated in the manner substantially as and for the purposes herein specified, described, and set forth.

In testimony whereof I have, on this 2d day of November, A. D. 1865, hereunto set my hand.

WM. EARL, JR.

Witnesses:
CHARLES D. KELLUM,
R. H. RIELLE.